United States Patent
Elbaz et al.

(10) Patent No.: US 8,162,696 B2
(45) Date of Patent: Apr. 24, 2012

(54) DONGLE WHICH IS INTENDED TO BE CONNECTED TO A PORT OF A TELECOMMUNICATIONS DEVICE

(75) Inventors: Didier Elbaz, Marseilles (FR); Francois Moutel, St. Zacharie (FR)

(73) Assignee: Gemalto SA, Meudon (FR)

( * ) Notice: Subject to any disclaimer, the term of this patent is extended or adjusted under 35 U.S.C. 154(b) by 1001 days.

(21) Appl. No.: 10/490,414

(22) PCT Filed: Sep. 24, 2002

(86) PCT No.: PCT/FR02/03247
§ 371 (c)(1),
(2), (4) Date: Mar. 23, 2004

(87) PCT Pub. No.: WO03/027946
PCT Pub. Date: Apr. 3, 2003

(65) Prior Publication Data
US 2004/0259423 A1 Dec. 23, 2004

(30) Foreign Application Priority Data
Sep. 24, 2001 (FR) ...................................... 01 12276

(51) Int. Cl.
*H01R 33/00* (2006.01)

(52) U.S. Cl. ....................................... 439/660; 439/76.1
(58) Field of Classification Search .................. 439/630, 439/660, 59, 76.1
See application file for complete search history.

(56) References Cited

U.S. PATENT DOCUMENTS

| | | | | |
|---|---|---|---|---|
| 4,642,734 A | * | 2/1987 | Anderson | 361/820 |
| 5,442,170 A | * | 8/1995 | Kreft et al. | 250/229 |
| 2003/0093609 A1 | * | 5/2003 | Drabczuk et al. | 710/315 |

FOREIGN PATENT DOCUMENTS

| | | |
|---|---|---|
| FR | 2783336 | 3/2000 |
| WO | WO94/10651 | 5/1994 |
| WO | WO01/69881 A2 | 9/2001 |

* cited by examiner

*Primary Examiner* — Khiem Nguyen
(74) *Attorney, Agent, or Firm* — Buchanan Ingersoll & Rooney PC

(57) ABSTRACT

A dongle is formed by a module having an integrated circuit chip which is connected to contact pads which are flush with the surface of the module. The dongle is intended to be connected to a port of a telecommunications device, having electric connecting pins. The contact pads correspond to the electric connecting pins in such a way that the pads can be directly connected to the pins.

34 Claims, 4 Drawing Sheets

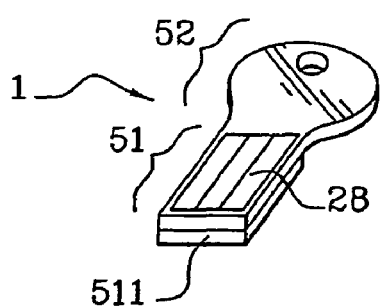
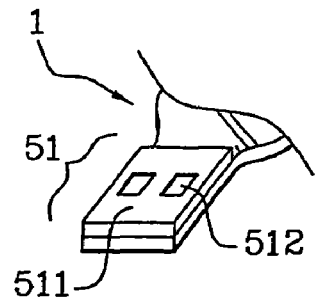
Fig. 8A        Fig. 8B
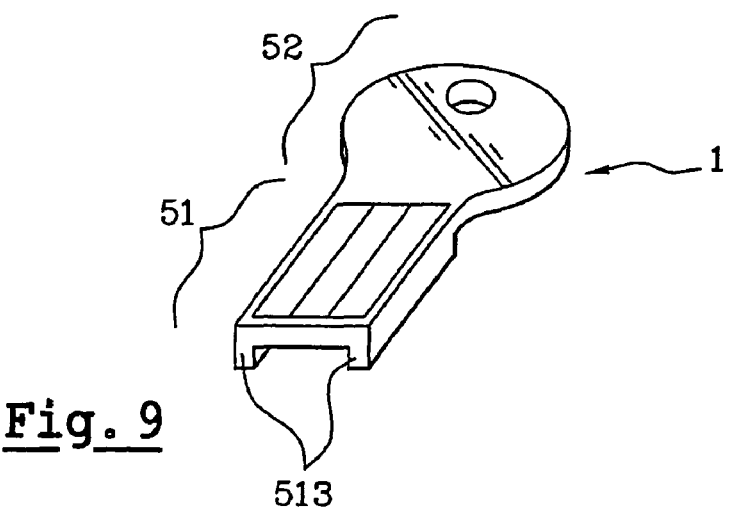
Fig. 9
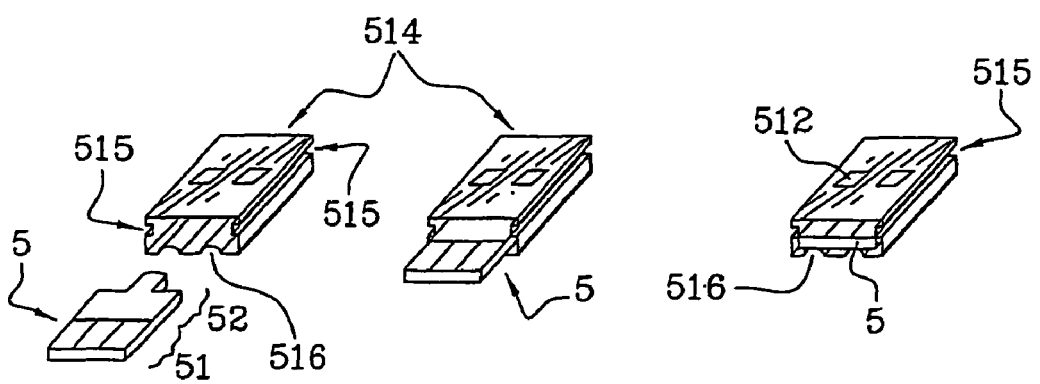
Fig. 10A        Fig. 10B        Fig. 10C

DONGLE WHICH IS INTENDED TO BE CONNECTED TO A PORT OF A TELECOMMUNICATIONS DEVICE

This disclosure is based upon French Application No. 01/12276, filed Sep. 24, 2001, and International Application No. PCT/FR02/03247, filed on Sep. 24, 2002, the contents of which are incorporated herein by reference.

BACKGROUND OF THE INVENTION

The invention concerns a dongle comprising a module comprising an integrated circuit chip connected to contact areas flush with the surface of the, said module, intended to be connected to a port of a telecommunication device.

The invention also relates to a method of manufacturing the said dongle.

The field of the invention is that of the protection of data, access to the Internet, identification, electronic commerce, on-line payment, etc, by means of a dongle of the USB (from the name of the standard "Universal Serial Bus" in English) type connected to a USB-type port of a telecommunication device such as a computer or mobile telephone; the field of application is the same as that of the chip card.

The user of a USB dongle can connect it to a personal computer, disconnect it therefrom when for example the use of the dongle is no longer necessary to the application which he has launched and then put it on his key ring in order to connect it subsequently.

The dimensions and electrical characteristics of the USB port and consequently those of the part of the dongle which is inserted in the port are standard.

However, several types of dongle exist at the present time.

Amongst these, the dongle described in the patent application WO 00/70533 under the name portable reader can be cited.

This portable reader 1 comprises, as indicated in FIG. 1, a part 2 for electrical connection to a port of a personal computer and an insertion part 4 of a removable electronic module 5. The electrical connection part 2, also depicted in FIG. 2, has a plastic support element 7 on the surface of which four parallel metallised lines forming a connector for an electrical connection of the reader 1 to the port fit flush. A first line 8 is intended for a Vbus current supply to the reader, second 9 and third 10 lines are intended for communicating digital data to the said reader 1 and a fourth line 11 is intended for earthing the reader 1.

The insertion part 4, more particularly shown in FIG. 2, has a connector 12, insertion runners 26 for the module 5 and a protective shell 14 enclosed by a cap 15.

The connector 12 is composed of a set of at least four connecting lugs 16, 17, 18 and 19 each electrically connected to one of the connection lines 8, 9, 10 and 11 of the connection part 2, as depicted in FIG. 3. The other lugs 20, 21, 22 and 23 are connected or not for example to an ISO/USB protocol conversion element 24 and/or to a clock element 25.

The module 5 obtained using a method of manufacturing a chip card 29 and depicted in FIG. 1 is composed of a plastic module body 27 in which there is embedded an integrated circuit chip connected to contact areas 28 flush with the surface of the said module 5 and comprising at least four contact areas for supplying current to the chip, communicating digital data and earthing.

When the reader 1 is connected to the computer and the latter is powered up, this computer detects the presence of the reader 1 and data can be exchanged between the chip of the module 5 and the computer via the USB bus system, according to the application resident in the chip: protection of data, Internet access, identification, electronic commerce, on-line payment, etc.

The cost of manufacturing these dongles is high because in particular of the number of elements 2, 5, 12 to be manufactured, assembled and electrically connected.

The purpose of the present invention is therefore to propose a dongle which is less expensive to manufacture.

SUMMARY OF THE INVENTION

One object of the invention is a dongle comprising a module 5 comprising an integrated circuit chip connected by connection means to contact areas 28 flush with the surface of the said module, intended to be connected to a port of a telecommunication device, the said port comprising electrical connection lugs, principally characterised in that the said contact areas 28 correspond to the said electrical connection lugs so as to be able to be directly connected to these lugs.

The port may be of the USB type.

The module 5 preferably comprises a module body 27 with the thickness of a chip card 29.

According to one characteristic of the invention, the dongle comprises a means for making all or part of its thickness, in particular at the level of the said contact areas 28, equal to a thickness determined by the thickness of the port.

The module body 27 having longitudinal edges, the said means can be composed of the said longitudinal edges having a thickness equal to the said determined thickness.

The means can also be a lining, possibly made from resin, applied to all or part of one of the faces of the module 5, opposite to that of the contact areas 28 and referred to as the bottom face, the lining and the module 5 then having together a thickness equal to the said determined thickness.

Preferentially, the dongle 1 and the module 5 form only a single element.

According to another characteristic of the invention, the means is an adaptor able to receive all or part of the said module 5.

The adaptor advantageously comprises means of guiding and locking the said module 5 and possibly means of positioning the module 5 at a height corresponding to a height determined by the thickness of the port.

Another object of the invention is a method of manufacturing a dongle comprising a module comprising an integrated circuit chip connected by connection means to contact areas flush with the surface of the said module, intended to be connected to a port of a telecommunication device, the said port comprising electrical connection lugs, characterised in that the said module is manufactured using a chip-card manufacturing method and in that its contact areas correspond to the electrical connection lugs so as to be able to be directly connected to the said connection lugs.

According to one characteristic of the invention, the port is of the USB type.

The port having a given format, and the module also comprising a module body, the method may comprise the step consisting of cutting out the module body in a format compatible with that of the port.

According to another characteristic of the invention, the module having longitudinal edges, the method comprises the step consisting of bending or curving the longitudinal edges so that these edges have a thickness equal to a thickness determined by the thickness of the port or the step consisting of fitting in or thermoforming or overmoulding a groove on each of the said longitudinal edges so that the said edges have a thickness equal to a thickness determined by the thickness of the port.

According to another characteristic of the invention, the method comprises the step consisting of depositing material on all or part of a face of the said module opposite to that of the contact areas so that the module has in whole or in part a thickness equal to a thickness determined by the thickness of the port and the step consisting of inserting the said module in an adaptor intended itself to be inserted in the said port.

BRIEF DESCRIPTION OF THE DRAWINGS

Other particularities and advantages of the invention will emerge clearly from a reading of the description given by way of non-limiting example and with regard to the accompanying drawings, in which:

FIGS. 8a and 8b depict schematically a dongle obtained according to a first embodiment of the invention, seen in perspective from above and below, FIG. 9 depicts schematically a dongle obtained according to a second embodiment of the invention, seen in perspective from above, FIGS. 10a, 10b and 10c depict schematically various steps of obtaining a dongle according to a third embodiment of the invention, seen in perspective from above.

DETAILED DESCRIPTION

In the remainder of the description, the same references are used for designating the same elements as those in the figures already described.

Figure 4:
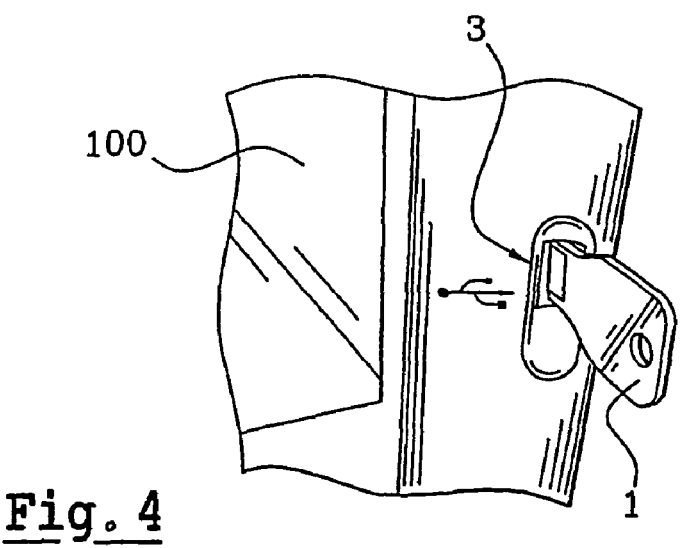
FIG. 4 depicts schematically a personal computer comprising a USB port in which a dongle is inserted.

FIG. 4 depicts a personal computer 100 comprising a USB port 3 in which a dongle 1 according to the invention is inserted.

The dongle 1 according to the invention integrates, in a single element, in this case the module 5, the various elements constituting this dongle described in the prior art.

Figure 5:
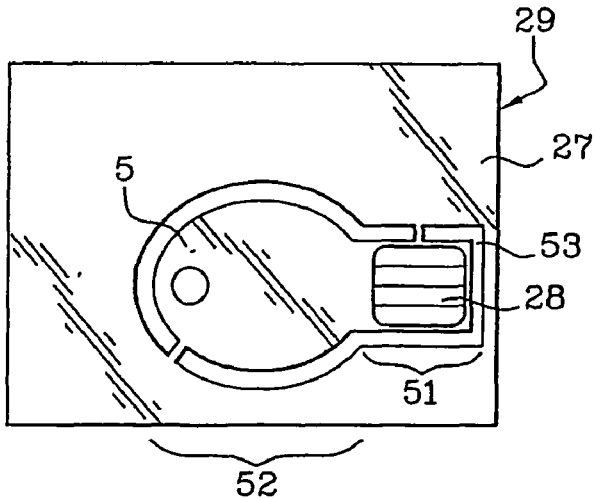
FIG. 5 illustrates schematically a chip card to the ISO format intended to become a dongle according to the invention.

As depicted in FIG. 5, the module 5 is advantageously cut from a chip card 29 of the contact type to the ISO format for example, along a cut 53 reproducing for example the shape of a key, the contact areas 28 of the chip card 29 being present on the part 51 of the dongle intended to be inserted in the port 3, the part 52 consisting of the body 27 of the card enabling the user of the dongle to manipulate it.

Figure 6:
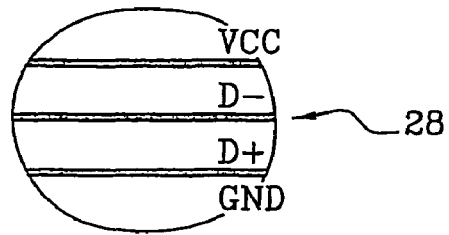
FIG. 6 depicts schematically the contact areas of a module intended to be connected to a port of the USB type.

The module 5 is manufactured so that the contact areas 28 of the module 5 are disposed in a configuration corresponding to the electrical connection lugs of the port which is described below. Four contact areas corresponding to the connection lugs of a port of the USB type are depicted in FIG. 6: one VCC for the current supply, another GND for the earth, the other two D− and D+ for the communication of the data, in accordance with the USB standard.

Figure 1:
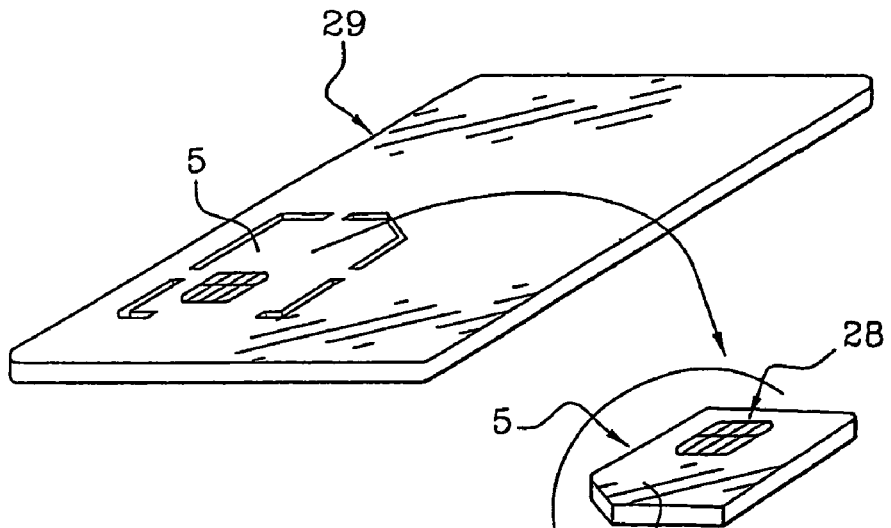
FIGS. 1 and 2, already described, depict schematically various elements of a portable reader according to the prior art, FIG. 3, already described, illustrates schematically various electrical connection lines within a portable reader according to the prior art.
Figure 2:
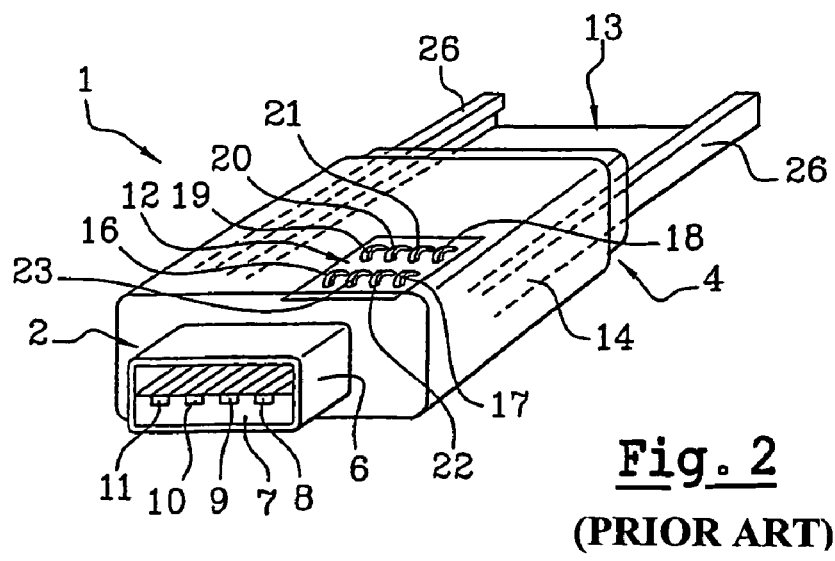
Figure 3:
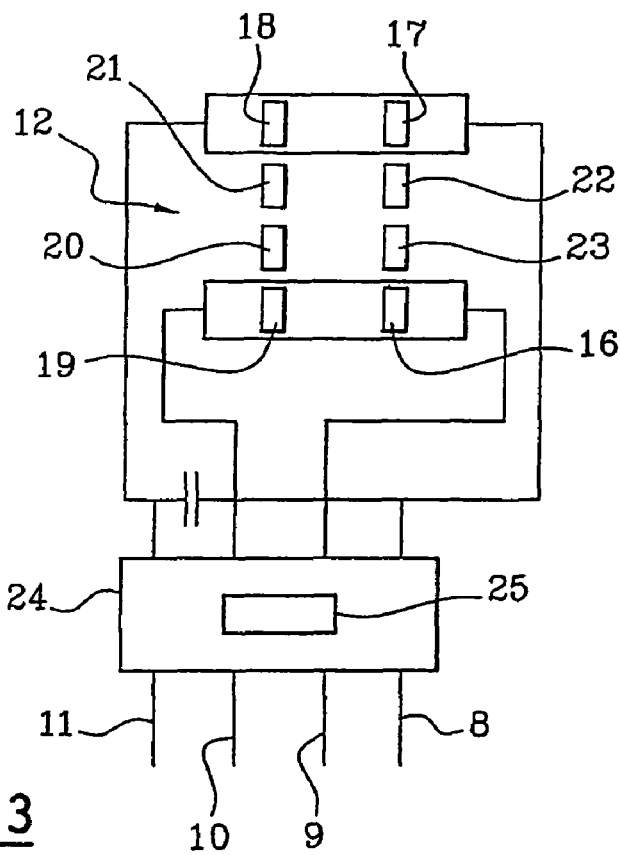

These contact areas are then advantageously substituted for the four metallised lines 8, 9, 10 and 11 depicted in FIGS. 1, 2 and 3 and then make the connector 12 and the means of connecting this connector to the four metallised lines superfluous.

In addition, the current chip cards of the contact type such as ISO cards already have certain characteristics ensuring for them good resistance to attacks caused by frequent usage, such as for example that of a bank card. It is then no longer necessary to provide, for the dongle according to the invention, elements for protecting the module such as the elements 6, 14 and 15 depicted in FIG. 1.

The dongle 1 according to the invention is finally composed only of the module 5. The method of manufacturing such a dongle 1 is then identical to the well-known method of manufacturing a chip card and has the advantage of eliminating the manufacture and assembly of the majority of the elements described in the prior art.

Figures 7A, 7B:
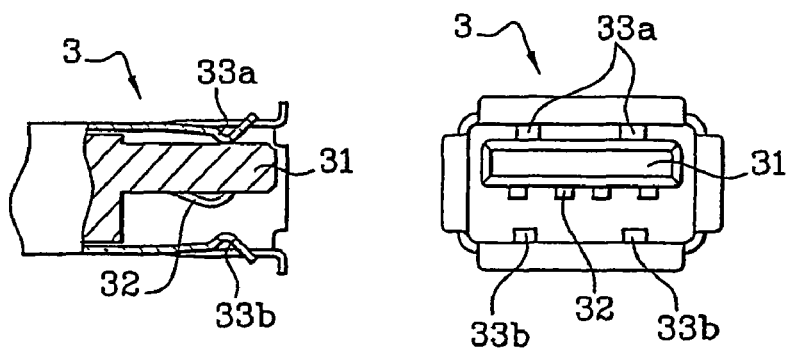
FIGS. 7a, 7b and 7c depict respectively a longitudinal section and a transverse section of a USB port and a longitudinal section of the port in which a dongle according to the invention is inserted.
Figure 7C:
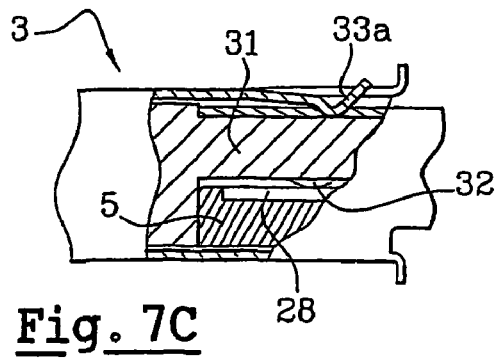

A port 3 of the USB type in which a dongle according to the invention is inserted is depicted in FIG. 7c. The port 3 without a dongle will first of all be described.

Such a port 3 is depicted in FIG. 7a along a longitudinal section and FIG. 7b along a transverse section. There can also be seen the connection lugs 32 fixed to a projecting connection part 31, top 33a and bottom 33b locking blades intended to lock the dongle in the port 3 when it is inserted therein. This locking is of course not definitive since the dongle is removable.

When the dongle according to the invention is inserted in the port as depicted in FIG. 7c, the contact areas 28 of the module are in contact with the connection lugs 32 of the port and the exchanges between the computer and the chip of the module can then take place, via the USB port. The bottom locking blades 33b (not shown in FIG. 7c) lock the dongle 1 in the inserted position; the top locking blades 33a are not used.

The majority of chip cards of the contact type manufactured at the present time, such as ISO cards, have a thickness of approximately 0.8 mm. The thickness of the dongle must be approximately 2 mm so that the contact areas 28 of the module can be in contact with the electrical connection lugs 32 of a port of the USB type when the dongle is inserted in the port, as depicted in FIG. 7c.

It is then necessary in this case to develop new specific ports of the USB type for dongles of this thickness or increase up to the desired thickness the thickness of the module or at the very least that of the part 51 which is intended to be inserted in the port.

Several methods can be envisaged.

As depicted in FIGS. 8a and 8b, a lining 511 can be applied to all or part of the bottom face of this part 51 of the module, that is to say the face opposite to the one where the contact areas 28 lie flush. This lining 511 can for example be obtained by the deposition of material, this material being able to be resin.

When the lining 511 is applied to all the bottom face of the part 51, it preferably has openings 512 intended to receive the bottom locking blades 33b of the port.

However, as depicted in FIG. 9, this lining 511 may be applied for example only to the longitudinal edges 513 of this part 51. The bottom locking blades 33b are then no longer used; the friction of the dongle 1 in the port 3 may suffice to lock the dongle 1 but any other locking means can be used.

The edges 513 of the module can also be curved at the part 51 by bending or curving in order to achieve the desired thickness.

A groove can also be added at the edges by embedding (adhesive bonding), thermoforming or overmoulding.

Another method consists of using an adaptor 514 depicted in FIGS. 10a, 10b and 10c, intended to receive the module 5 or at the very least the part 51 of the module and whose outside dimensions are compatible with the inside dimensions of the port: the adaptor can for example take the outside dimensions of the part 6 depicted in FIGS. 1 and 2.

More precisely, FIG. 10a shows the adaptor 514 in which the module 5 has not yet been inserted, FIG. 10b the adaptor 514 in which the module 5 is in the course of being inserted and FIG. 10c the adaptor 514 in which the module 5 is inserted.

The adaptor 514 comprises means 515 of guiding the module 5 or the part 51 of the module, consisting for example of ribs situated on the sides, and means (not shown) of locking the module 5 or the part 51, in the inserted position in the adaptor, consisting for example of a stop disposed at the bottom of the connector. These locking means do not necessarily lock the module in the adaptor definitively; the module is preferably removable in order possibly to be replaced by another module.

It also comprises means 516 for raising the module 5 or the part 51 so that the contact areas 28 are in contact with the connection lugs 32 when the dongle 1 consisting of the adaptor plus module assembly is inserted in the port 3: these means 516 can be ribs situated at the base of the connector 514 or on the sides and thus cooperate with the guidance means 515. The guidance means 515 of the module then also ensure the positioning of the module at the correct height.

The ribs can be obtained by bending, pressing, punching etc.

The adaptor 514 can also comprise top and/or bottom openings 512 (not visible in these plan views) intended to receive the locking blades 33a and/or 33b when it is inserted in the port 3.

This adaptor also provides additional protection for the module.

It may also provide additional protection for a module having the required thickness such as those depicted in FIGS. 8a and 9, then not requiring to be raised; in this case, the adaptor does not comprise any means 516 for raising the module.

In the chip card technology used by the invention, the devices with an integrated circuit chip or module according to the invention use, as starting components, components in accordance with all or part of ISO 7816 or the standard for SIM minicards or even the cards of the next generation. Thus, for example, according to the 7816 standard, the card body is a rectangular body having flat top and bottom faces and whose thickness is equal to 0.76 mm; the contact areas are at the same level as the top face of the card body. According to the standard the tolerance in level is for example 50 μm; the integrated circuit chip is situated vertically level with the contact areas to which it is electrically connected; it forms part of a micromodule which is then embedded in a cavity of a card body obtained generally by injection moulding or lamination.

The micromodule generally comprises a dielectric support film carrying on one side contact areas and on the other, vertically in line with the contact areas, the integrated circuit chip. A drop of protective resin generally coats the integrated circuit chip and its connections to the contact areas. The micromodule is fixed in the cavity in particular by adhesive bonding by means in particular of an adhesive film or drops of adhesive. The cavity receiving the micromodule is generally in two stages, one for receiving the dielectric and the contact areas, the other for receiving the integrated circuit chip.

To obtain the device of the invention, the body is then adapted to the format of the port envisaged to allow its insertion and electrical connection by direct physical contact of the contact areas with the port connectors. The adaptation can be made either via a shape adaptor or by creating linings on certain parts of the body, in particular on certain parts of the bottom face of the body, the linings can be formed in particular by deformation of the body or by adding material to certain parts of the body.

The device of the invention therefore preferably comprises, for reasons of cost, the most possible of the characteristics of the above chip card components.

The invention claimed is:

1. A dongle comprising a module including an integrated circuit chip connected to contact areas flush with the surface of said module, for connection to a port of a telecommunication device, said port having electrical connection lugs, wherein said contact areas correspond to said electrical connection lugs so as to be able to be directly connected to said lugs, and a lining applied to all or part of one of the faces of the module, opposite to said surface on which said contact areas are disposed, such that said lining and said module together have a thickness equal to a thickness determined by the thickness of the port.

2. A dongle according to claim 1, wherein the port is of the USB type.

3. A dongle according to claim 1, wherein the module includes a module body with the thickness of a standardized chip card.

4. A dongle comprising a substantially planar substrate that is directly insertable into a USB port of a communication device having parallel electrical connection lugs, said substrate having an integrated circuit chip storing a chip card application program directed to one or more of protection of data, access to the Internet, identification, electronic commerce, and on-line payment, said substrate further having contact areas that are flush with an insertable planar surface of said substrate so as to be in direct contact with said lugs when said substrate is inserted into the USB port in order for all of the contact areas to communicate with the communication device.

5. The dongle of claim 4 wherein said substrate comprises a portion of an integrated circuit chip card.

6. The dongle of claim 4 wherein said contact areas have a linear shape and are oriented in a direction parallel to the direction of insertion of said substrate into said port.

7. A dongle according to claim 4, further comprising means for making all or part of the thickness of said dongle equal to a thickness determined by the thickness of the port.

8. A dongle according to claim 7, wherein said means provides said determined thickness at said contact areas.

9. A dongle according to claim 7, wherein the substrate has longitudinal edges, and wherein said means is formed by said longitudinal edges having a thickness equal to said determined thickness.

10. A dongle comprising a substantially planar substrate that is directly insertable into a port of a telecommunications device having electrical connection lugs, said substrate having an integrated circuit chip and contact areas that are flush with one of the major surfaces of said substrate so as to be in direct contact with said lugs when said substrate is inserted into the port, and further comprising a lining applied to all or part of a surface of the substrate, opposite to that of the contact areas, said lining and said substrate having together a thickness equal to a thickness determined by the thickness of the port.

11. A dongle according to claim 10, wherein said lining is composed of resin.

12. A dongle according to claim 1, wherein the dongle and the module are integrated in a single element.

13. A dongle comprising a substantially planar substrate that is directly insertable into a port of a telecommunications device having electrical connection lugs, said substrate having an integrated circuit chip and contact areas that are flush with one of the major surfaces of said substrate so as to be in direct contact with said lugs when said substrate is inserted into the port, further comprising an adaptor able to receive all or part of said substrate, for making all or a part of the thickness of said dongle equal to a thickness determined by the thickness of the port.

14. A dongle according to claim 13, wherein said adaptor comprises means for guiding said substrate and means for locking said substrate.

15. A dongle according to claim 14, wherein the adaptor comprises means for positioning the substrate at a height corresponding to a height determined by the thickness of the port.

16. A method of manufacturing a dongle comprising a module having an integrated circuit chip connected to contact areas flush with the surface of said module, for connection to a port of a telecommunication device, said port having electrical connection lugs, comprising the steps of manufacturing a chip card so that its contact areas correspond to the positions of the electrical connection lugs so as to be able to be directly connected to said connection lugs, and depositing material over all or part of a face of said module opposite to that of the contact areas so that the module has in whole or in part a thickness equal to a thickness determined by the thickness of the port.

17. A method according to claim 16, wherein the port is of the USB type.

18. A method according to claim 16, wherein the port has a determined format, and the module includes a module body, further comprising the step of cutting said module body according to a format compatible with that of said port.

19. A method according to claim 16, wherein the module has longitudinal edges and said method comprises the step of bending or curving said longitudinal edges so that said edges have a thickness equal to a thickness determined by the thickness of the port.

20. A method according to claim 16, wherein the module has longitudinal edges and said method comprises the step of forming a groove on each of said longitudinal edges so that said edges have a thickness equal to a thickness determined by the thickness of the port.

21. A dongle comprising a module having an integrated circuit chip storing a chip card application program directed to one or more of protection of data, access to the Internet, identification, electronic commerce, and on-line payment, said integrated circuit chip being connected to contact areas that are flush with a surface of said module, said module being directly insertable into a USB port of a communication device having electrical connection lugs, and said contact areas having a linear shape oriented in a direction parallel to the direction of insertion of said module into said USB port and disposed so as to be in direct contact with said lugs when said module is inserted into the USB port in order for all of the contact areas to communicate with the communication device.

22. The dongle according to claim 21, wherein the module includes a module body with the thickness of a standardized chip card.

23. A dongle comprising a module having a module body with the thickness of a standardized chip card and including an integrated circuit chip connected to contact areas that are flush with a surface of said module body, and being directly insertable into a port of a telecommunications device having electrical connection lugs, said contact areas having a linear shape oriented in a direction parallel to the direction of insertion of said module into said port and disposed so as to be in direct contact with said lugs when said module is inserted into the port, and further including a lining on at least a part of the surface of said body opposite said contact areas, to provide the dongle with a thickness in the region of said contact areas that is equal to a thickness determined by the dimensions of said port.

24. The dongle of claim 22 wherein said body has longitudinal edges with a thickness equal to a thickness determined by the dimensions of said port.

25. A dongle comprising a module having a module body with the thickness of a standardized chip card and including an integrated circuit chip connected to contact areas that are flush with a surface of said module body, and being directly insertable into a port of a telecommunications device having electrical connection lugs, said contact areas having a linear shape oriented in a direction parallel to the direction of insertion of said module into said port and disposed so as to be in direct contact with said lugs when said module is inserted into the port, and further including an adaptor in which said module is received, said adaptor having dimensions complementary to those of the port and supporting said module in a position such that, when said adaptor and module are inserted in the port, said contact areas are held in contact with said lugs.

26. An integrated circuit chip card component that is directly insertable into a USB port having electrical connection lugs, said chip card component having an integrated circuit and contact areas that are flush with a surface of said component, and means for maintaining said component, when inserted into a USB port, at a position such that said contact areas are in direct contact with said lugs, wherein said integrated circuit stores a chip card application program directed to one or more of protection of data, access to the Internet, identification, electronic commerce, and on-line payment, and wherein all of the contact areas are configured to communicate with the same external device.

27. The integrated circuit chip card component of claim 26, wherein said maintaining means comprises structure on said component that imparts a thickness to said component that is complementary to the dimensions of the USB port.

28. The integrated circuit chip card component of claim 26, wherein said maintaining means comprises an adaptor in which said component is received, said adaptor having dimensions complementary to those of the port and supporting said component in a position such that, when said adaptor and module are inserted in the port, said contact areas are held in contact with said lugs.

29. The integrated circuit component of claim 26 wherein said component comprises a cut-out from an integrated circuit chip card that conforms to a standardized ISO format.

30. An integrated circuit chip card having a size that conforms to a standardized ISO format and includes an integrated circuit and contacts that are flush with a surface of said card, and further including an incision that defines a cut-out portion that contains said integrated circuit and contacts, said integrated circuit storing a chip card application program directed to one or more of protection of data, access to the Internet, identification, electronic commerce, and on-line payment, and said cut-out portion constituting a dongle that is directly insertable into a port of a telecommunications device having lugs, such that said contacts are in direct contact with said lugs when the dongle is inserted into the port, wherein all of the contacts are configured to communicate with the telecommunications device.

31. The integrated circuit chip card of claim 30 wherein said contacts have a linear shape and are oriented in a direction parallel to the direction of insertion of said dongle into the port.

32. A dongle comprising a substantially planar substrate that is directly insertable into a port of a communication device having parallel electrical connection lugs, said substrate having an integrated circuit chip storing a chip card application program directed to one or more of protection of data, access to the Internet, identification, electronic commerce, and on-line payment, said substrate further having contact areas that are flush with an insertable planar surface of said substrate so as to be in direct contact with said lugs when said substrate is inserted into the port in order for all of the contact areas to communicate with the communication device.

33. A dongle comprising a substantially planar substrate that is directly insertable into a port of a communication device having parallel electrical connection lugs, said substrate having an integrated circuit chip storing a chip card application program directed to one or more of protection of data, access to the Internet, identification, electronic commerce, and on-line payment, said substrate further having contact areas that lead to an insertable planar surface of said substrate so as to be in direct contact with said lugs when said substrate is inserted into the port in order for all of the contact areas to communicate with the communication device.

34. A dongle having a card shape comprising a substantially planar substrate that is directly insertable into a port of a communication device having parallel electrical connection lugs, said substrate having an integrated circuit chip storing a chip card application program directed to one or more of protection of data, access to the Internet, identification, electronic commerce, and on-line payment, said substrate further having contact areas that lead to an insertable planar surface of said substrate so as to be in direct contact with said lugs when said substrate is inserted into the port in order for all of the contact areas to communicate with the communication device.

* * * * *